United States Patent
Standbridge et al.

(10) Patent No.: US 10,302,218 B2
(45) Date of Patent: May 28, 2019

(54) DRILL STEM SAFETY VALVE ACTUATOR

(71) Applicant: HI-KALIBRE EQUIPMENT LIMITED, Edmonton (CA)

(72) Inventors: Tony Charles Leon Standbridge, Edmonton (CA); Jorge Pablo Chapital, Edmonton (CA); Aaron Ben Ephraim, Edmonton (CA); Hamidreza Ahmadimoghaddam, Edmonton (CA); Amol Jagadish Sagare, Edmonton (CA); Tod Michael Hohl, Sherwood Park (CA); Patrick Rabby, Sherwood Park (CA); Brian James Brisbane, Edmonton (CA)

(73) Assignee: Hi-Kalibre Equipment Limited (CA)

(*) Notice: Subject to any disclaimer, the term of this patent is extended or adjusted under 35 U.S.C. 154(b) by 196 days.

(21) Appl. No.: 15/184,848

(22) Filed: Jun. 16, 2016

(65) Prior Publication Data
US 2016/0369589 A1    Dec. 22, 2016

Related U.S. Application Data

(60) Provisional application No. 62/181,022, filed on Jun. 17, 2015.

(51) Int. Cl.
| | | |
|---|---|---|
| *E21B 21/10* | (2006.01) | |
| *E21B 34/02* | (2006.01) | |
| *F16K 27/06* | (2006.01) | |
| *F16K 5/06* | (2006.01) | |
| *F16K 31/44* | (2006.01) | |
| *F16K 31/54* | (2006.01) | |
| *E21B 34/00* | (2006.01) | |

(52) U.S. Cl.
CPC ............ *F16K 31/54* (2013.01); *E21B 21/106* (2013.01); *F16K 5/0647* (2013.01); *F16K 27/067* (2013.01); *F16K 31/445* (2013.01); *E21B 2034/002* (2013.01)

(58) Field of Classification Search
CPC ........ E21B 21/10; E21B 21/106; E21B 21/08; E21B 34/02; E21B 33/06; E21B 2034/002; F16K 27/067; F16K 5/0647; F16K 31/54; F16K 31/445
See application file for complete search history.

(56) References Cited

U.S. PATENT DOCUMENTS

| | | |
|---|---|---|
| 3,806,082 A | 4/1974 | Kellner |
| 3,941,348 A * | 3/1976 | Mott ................ E21B 21/08 166/223 |
| 4,390,161 A | 6/1983 | Nelson |
| 4,519,576 A | 5/1985 | Winegeart |

(Continued)

FOREIGN PATENT DOCUMENTS

DE    102014202023 A1 * 7/2015 ........... E21B 21/106

*Primary Examiner* — George S Gray
(74) *Attorney, Agent, or Firm* — Scott T. Griggs; Griggs Bergen LLP

(57) ABSTRACT

A drill stem safety valve actuator that eliminates the need for a hydraulic union. The actuator can include a mounting sleeve that can be affixed to the valve, that can further have a pinion gear that can rotate a ball valve. The actuator can include a rack sleeve slidably disposed on the mounting sleeve, having a rack configured to engage the pinion wherein sliding the rack sleeve linearly along the length of the mounting sleeve rotates the pinion, thus, the ball valve.

20 Claims, 10 Drawing Sheets

(56) References Cited

U.S. PATENT DOCUMENTS

| | | | |
|---|---|---|---|
| 4,650,153 | A | 3/1987 | Winegeart |
| 5,507,467 | A | 4/1996 | Mott |
| 5,979,865 | A | 11/1999 | Rabby |
| 6,840,493 | B2 | 1/2005 | York et al. |
| 7,461,698 | B2 | 12/2008 | Klipstein |
| 8,079,569 | B2 | 12/2011 | Lesko |
| 8,113,544 | B2 | 2/2012 | Fultz et al. |
| 8,443,876 | B1 | 5/2013 | Keast |
| 8,752,653 | B2 | 6/2014 | Seneviratne et al. |

* cited by examiner

DRILL STEM SAFETY VALVE ACTUATOR

CROSS-REFERENCE TO RELATED APPLICATIONS

This application claims priority of U.S. provisional patent application Ser. No. 62/181,022 filed Jun. 17, 2015, which is incorporated by reference into this application in its entirety.

TECHNICAL FIELD

The present disclosure is related to the field of valve actuators, in particular, actuators for drill stem safety valves.

BACKGROUND

Drill stem safety valves ("DSSV") typically have two primary purposes: a) they are a safety device that can be closed to prevent mud and/or well fluid from flowing back up the interior of the drill pipe in the event of an unbalanced pressure in the mud column; and b) they can be used as a flow control device to turn on and off the flow of mud while making and breaking connections during drilling operations for top drives. When used for blow out prevention, these valves are only used during testing or in emergencies. However, in mud control, they can be operated several hundred times in the drilling of a single well.

To operate a DSSV, the stem is turned ninety degrees from open to closed position and back again, by applying torque to the DSSV stem. This torque can be applied manually, or by remote actuator. For mud saving operations, remote actuation is the preferred method of applying torque to the DSSV. Remote actuators generally deliver the torque to the stem of a valve through a hexagonal or square shaft that interfaces with the matching internal profile of the stem.

When the valve is used for blowout prevention, the valve can be subjected to high internal pressure which causes a significant amount of compressive load on the valve ball as it moves from open to close. This high load necessitates the application of high torque to the valve stem in order to ensure that the ball completely closes and fully stops the unwanted flow reversal. Some valves require upwards of 2000 ft-lbs to operate. A remote actuator is the most efficient method for delivering the high torque required.

Actuators generally supply a fixed amount of torque, i.e. the maximum output of the actuator. The high torque delivered to valve stem can damage the internal stops for the valve stems. This damage generally leads to over travel of the ball in the open, close, or both positions. This over travel can be detrimental to the life of the valve and the safety that it is supposed to provide. For example, when the ball over travels in the open position, the flow of mud is directed off the longitudinal axis of the valve leading to accelerated wash of the valve's internal components. When the ball over travels in the close position, the valve ball may rotate to the extent that it no longer completely blocks the flow of mud, or in the case of blowout prevention: reservoir fluids.

Remote actuators currently use pneumatics and/or hydraulics to create the motive force that applies torque to the actuator/DSSV interface. In most cases, a linear motion is translated to a rotational motion through the use of racks and pinions or linkages.

In order to be able to deliver the torque to the DSSV stem, the actuator must be attached to the DSSV thus rotating when the DSSV is rotating. Therefore, delivery of pneumatic or hydraulic pressure to the actuator becomes problematic. The current methods of overcoming the delivery of pressure from a stationary source to a rotating actuator is through a hydraulic/pneumatic union or isolation of the actuators force generating mechanisms: typically hydraulic/pneumatic cylinders.

The advantage of using hydraulic unions is that they are very compact, very efficient, and very powerful. Full hydraulic pressure can be redirected through these devices and delivered directly to the hex drive shaft either through racks and pinions or through linkages. In this mode of design, all the actuator's force generating components can be internalized within the actuator body. The internalizing of the force generating components (typically racks and pinions) allows the actuator to remain relatively small, in comparison to other styles of actuators, while still delivering comparable torque. As well, as all the force components are internalized, the possibility of damage is greatly reduced improving reliability. In addition the union can be designed to operate as a plain bearing for the rotational component, eliminating the need for costly bearings and again saving space.

However, one draw back of the hydraulic union method is the design and use of small cross section hydrodynamic seals that seal oil glands between the stationary part of the actuator and the rotating part. The hydrodynamic seals provide positive sealing, due to seal compression, while the actuator remains stationary, but allow small amounts of oil to bypass when creating a dynamic seal. The bypassing oil ensures that the seal face remains lubricated, effectively creating a short journal bearing. The lubrication significantly reduces friction between the seal and the rotating member thereby extending seal life. Over time, this seepage and the combined inevitable seal wear from operation will escape to the environment, as collection and reuse methods are typically not incorporated into the actuator design.

The hydraulic fluid between the seal and the rotating member is subjected to high shear rates which in turn generate heat that is difficult to dissipate due to the actuators high thermal mass and small surface area. Further, if the hydraulic pressure to function the actuator acts on the seals while the actuator is rotating, the seals increase their facial surface force and act as a brake on the rotating member. Thus, heat generation and seal wear increase significantly.

In order to overcome leakage from the dynamic seals and the associated heat generation, some actuators have isolated the force generation by moving the hydraulic or pneumatic cylinders to the exterior non-rotating portion of the actuator. The external cylinders deliver a force to a moveable sleeve, isolated by bearings systems, which in turn drive linkages to create the torque at the actuator/DSSV stem interface.

The isolation of the cylinders often results in a larger less rigid actuator than the hydraulic union type due to the mounting methods of the cylinders and internal clearances required between the axially shifting sleeve(s). The reduction in rigidity results in accelerated wear of the joints that connect the cylinders to the non-moving part. As well, any linkages that are used to supply torque to the interface between the actuator/DSSV often develop significant unintended clearances. The increased wear at joints of the linkages and cylinders leads to inaccurate functioning of the DSSV, i.e. the DSSV is not moved from full open to full close when the actuator is moved through its range of motion.

Linkages are typically not as efficient as rack and pinion designs, and do not possess the same amount of mechanical advantage. In addition, because of their low mechanical advantage, linkages can be susceptible to moving without being actuated, as the vibration associated with drilling has been known to cause these linkages to move under their own weight and inadvertently close the valve during drilling cycles.

Regardless of the actuator style, the output torque is often limited by the size of hydraulic or pneumatic cylinders that can be incorporated into the design and their respective radial offset location from the axis of the DSSV's crank center. In the case of the externally mounted cylinders, the cylinders usually have a small diameter with a thin wall in order to keep the overall actuator size to a minimum. The small thin walled cylinders have limited pressure retention, thus the output force is also limited. The union style actuators typically do not suffer from the same pressure limits to their force generation components. However, as the force generating components are internal to the small diameter bodies, the offset distance between the force generation and the crank center of rotation is severely limited.

For any DSSV, the correct alignment of the ball in the open and closed position is critical to optimal valve life. Without correct alignment in the open position, the leading edge of the ball and the trailing edge of the lower seat will be exposed to abrasive mud flow, causing premature wear and potentially vortices that can accelerate erosion. The resulting deflected flow path and resulting accelerated erosion can lead to premature failure.

As the alignment of the ball is critical for valve service life, most remote actuators rely on the valve's internal stops to set the alignment of the ball. Without the internal stops, most actuators would provide excess rotational motion thereby allowing the ball to over travel in both the open and close positions.

Since the DSSV stem internal stops are used, the stops often get damaged (resulting in misalignment of the ball) from the high contact stresses that the actuator's output torque generates. Very few actuators have a provision for adjusting the actuators output motion limits. This adjustment would allow the actuator to correct the balls alignment within the valve without the need to perform costly repairs on the valve itself.

It is, therefore, desirable to provide an for a DSSV that overcomes the shortcomings of the prior art by eliminating the need for a hydraulic union thus eliminating the leakage and seal wear problems that are associated with prior art designs.

SUMMARY

An actuator for operating a DSSV on a drill stem that eliminates the need for a hydraulic union is provided. In some embodiments, the actuator can comprise a mounting sleeve that can be affixed to a valve by a plurality of set screws and/or by a clamp at either end of the mounting sleeve. The mounting sleeve can comprise at least one master pinion gear rotatably disposed on an outer sidewall of the mounting sleeve that can rotate a hex shaft of a ball valve drive. In some embodiments, the actuator can further comprise a rack sleeve slidably disposed circumferentially on the mounting sleeve, the rack sleeve comprising a master rack disposed thereon, the rack configured to engage the master pinion wherein sliding the rack sleeve linearly along the length of the mounting sleeve rotates the master pinion thus rotating the ball valve drive and a ball valve coupled thereto.

In some embodiments, the actuator can comprise a shifting sleeve disposed circumferentially on the rack sleeve, the shifting sleeve configured to rotate about the rack sleeve and still be able to engage the rack sleeve to slide it along the length of the mounting sleeve. In some embodiments, the rack sleeve can comprise a plurality of spaced—part rollers disposed circumferentially around the diameter of the rack sleeve wherein the shifting sleeve can comprise a channel configure to receive the plurality of rollers. In this configuration, the shifting sleeve can rotate around the rack sleeve by the rollers traveling in the channel and still engage or exert force on the rack sleeve to move it slidably on the mounting sleeve, thus, rotating the master pinion.

In some embodiments, the actuator can further comprise hydraulic or pneumatic piston mechanisms disposed in a shroud or structure enclosing the mounting, rack and shifting sleeves wherein the piston mechanisms can move the shifting sleeve back and forth within the shroud or structure to open or close the valve, even while the drill stem is rotating. In other embodiments, the actuator can comprise an electric screwjack or a linear actuator as means for moving the shifting sleeve back and forth within the shroud or structure.

In some embodiments, the actuator can comprise a compact design wherein the hydraulic piston mechanisms can deliver motive force to the rack sleeve and the master pinion, and so can have the advantage of providing nearly as much torque as traditional hydraulic union actuators.

In some embodiments, the use of a rack and pinion mechanism in the actuator can maintain a fail last position, as the pinion does not move on its own through vibration that is normally associated with drilling.

In some embodiments, the actuator can allow for precise adjustment of stops to limit the wear and over travel on the valve stops, and can further allow for better alignment during actuation and prolonging valve life.

Broadly stated, in some embodiments, an actuator can be provided for operating a valve disposed in a rotatable drill stem comprising a passageway therein, the drill stem defining a longitudinal axis, the valve comprising a valve mechanism configured for opening and closing the passageway, the actuator comprising: first means for attaching to the valve, the first means comprising a coupler configured for operatively coupling to the valve mechanism; second means disposed on the first means and configured for slidable movement on the first means along the longitudinal axis, the second means operatively coupled to the coupler; and third means for slidably moving the second means on the first means, the third means rotatably coupled to the first means and to the second means wherein the third means is substantially stationary when the drill stem is rotating.

Broadly stated, in some embodiments, a method can be provided for operating a valve disposed in a rotatable drill stem comprising a passageway therein, the drill stem defining a longitudinal axis, the valve comprising a valve mechanism configured for opening and closing the passageway, the method comprising the steps of: providing an actuator, comprising: first means for attaching to the valve, the first means comprising a coupler configured for operatively coupling to the valve mechanism, second means disposed on the first means and configured for slidable movement on the first means along the longitudinal axis, the second means operatively coupled to the coupler, and third means for slidably moving the second means on the first means, the third means rotatably coupled to the first means and to the second means wherein the third means is substantially stationary when the drill stem is rotating; attaching the actuator to the valve; and moving the second means relative to the first means using the third means to operate the valve.

Broadly stated, in some embodiments, an actuator can be provided for operating a valve disposed in a rotatable drill stem comprising a passageway therein, the drill stem defining a longitudinal axis, the valve comprising a ball valve disposed therein, the ball valve configured for opening and closing the passageway, the actuator comprising: a mounting sleeve configured for attaching to the valve, the mounting sleeve further comprising a master pinion configured for coupling to the ball valve and rotating the ball valve to open and close the passageway; a rack sleeve circumferentially disposed on the mounting sleeve and configured for slidable movement on the mounting sleeve along the longitudinal axis, the rack sleeve operatively coupled to the master pinion wherein the master pinion rotates about an axis substantially perpendicular to the longitudinal axis when the rack sleeve moves slidably on the mounting sleeve along the longitudinal axis; and shifting means for slidably moving the rack sleeve on the mounting sleeve, the shifting means rotatably coupled to the mounting sleeve and to the rack sleeve wherein the shifting means is substantially stationary when the drill stem is rotating.

Broadly stated, in some embodiments, a method can be provided for operating a valve disposed in a rotatable drill stem comprising a passageway therein, the drill stem defining a longitudinal axis, the valve comprising a ball valve disposed therein, the ball valve configured for opening and closing the passageway, the method comprising the steps of: providing an actuator, comprising: a mounting sleeve configured for attaching to the valve, the mounting sleeve further comprising a master pinion configured for coupling to the ball valve and rotating the ball valve to open and close the passageway, a rack sleeve circumferentially disposed on the mounting sleeve and configured for slidable movement on the mounting sleeve along the longitudinal axis, the rack sleeve operatively coupled to the master pinion wherein the master pinion rotates about an axis substantially perpendicular to the longitudinal axis when the rack sleeve moves slidably on the mounting sleeve along the longitudinal axis, and shifting means for slidably moving the rack sleeve on the mounting sleeve, the shifting means rotatably coupled to the mounting sleeve and to the rack sleeve wherein the shifting means is substantially stationary when the drill stem is rotating; attaching the actuator to the valve; and moving the rack sleeve relative to the mounting sleeve using the shifting sleeve to rotate the ball valve.

Broadly stated, in some embodiments, the master pinion can further comprise at least one gear coupled to a ball valve drive that is configured to engage the ball valve.

Broadly stated, in some embodiments, the mounting sleeve can further comprise a plurality of set screws configured to engage the valve to attach the mounting sleeve thereto.

Broadly stated, in some embodiments, the actuator can further comprise at least one clamp configured to clamp an end of the mounting sleeve to the valve.

Broadly stated, in some embodiments, the rack sleeve can further comprise a master rack configured to engage with the master pinion.

Broadly stated, in some embodiments, the shifting means can comprise: first and second end plates rotatably attached to opposing ends of the mounting sleeve; at least one shroud plate operatively connecting the first and second end plates to form at least a partially enclosed or a fully enclosed structure; a shifting sleeve disposed between the first and second end plates and circumferentially disposed on the rack sleeve, the rack and shifting sleeves, in combination, comprising means for enabling the shifting sleeve to engage the rack sleeve and to rotate relative to the rack sleeve about the longitudinal axis; and the first and second end plates and the shifting sleeve, in combination, comprising means for moving the shifting sleeve linearly back and forth between the first and second end plates thereby engaging the rack sleeve to move slidably on the mounting sleeve along the longitudinal axis.

Broadly stated, in some embodiments, the enabling means can comprise: a plurality of spaced-apart rollers rotatably disposed circumferentially on an outer sidewall of the rack sleeve; and a channel disposed circumferentially on an inner sidewall of the shifting sleeve, the channel configured to receive the plurality of spaced-apart rollers.

Broadly stated, in some embodiments, the moving means can comprise: at least one first displacement mechanism disposed between the first end plate and the shifting sleeve, the at least first displacement mechanism configured to urge the shifting sleeve away from the first end plate; and at least one second displacement mechanism disposed between the second end plate and the shifting sleeve, the at least second displacement mechanism configured to urge the shifting sleeve away from the second end plate.

Broadly stated, in embodiments, each of the at least one first and second displacement mechanisms can comprise one or more of a group consisting of a hydraulic piston and cylinder combination, a pneumatic piston and cylinder combination, an electric screwjack and a linear actuator.

DETAILED DESCRIPTION OF EMBODIMENTS

Figure 1:
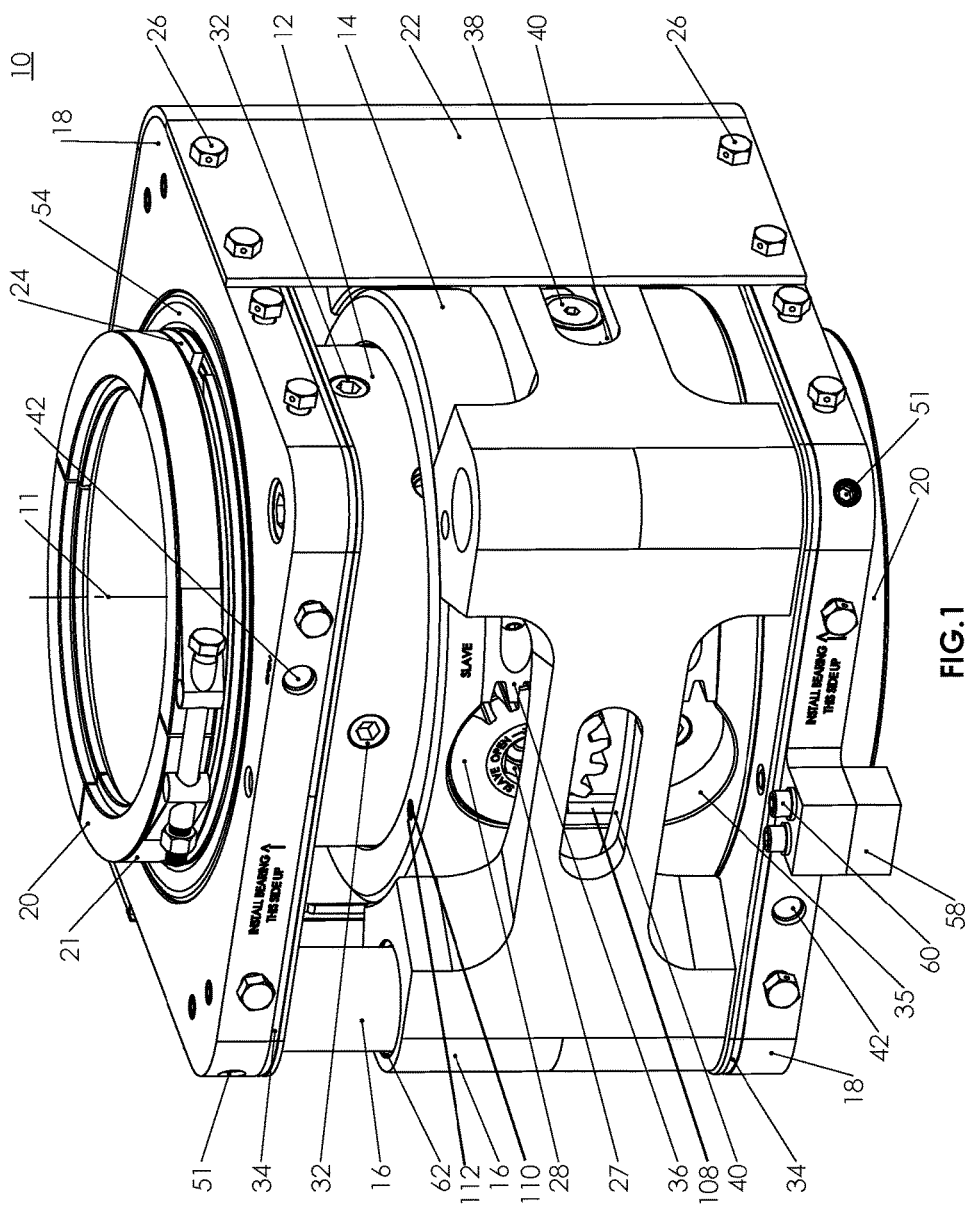
FIG. 1 is a perspective view depicting one embodiment of a drill stem safety valve actuator.
Figure 2:
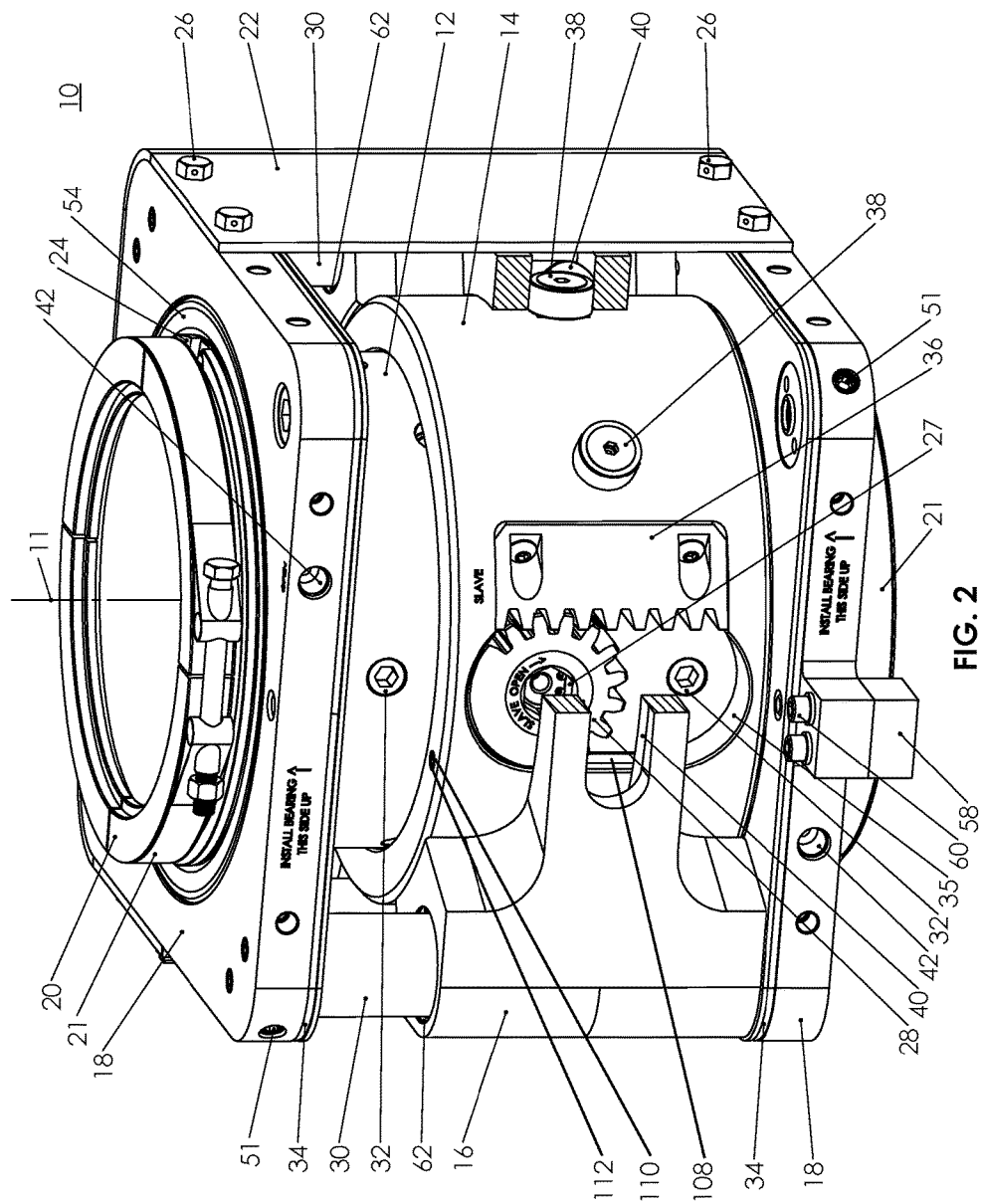
FIG. 2 is a perspective view depicting the actuator of FIG. 1 with a portion of the shifting sleeve removed to illustrate the rack and pinion mechanism.

Referring to FIGS. 1 to 3 and FIG. 9, one embodiment of actuator 10 is shown. In some embodiments, actuator 10 can comprise, broadly, mounting sleeve 12, rack sleeve 14 and shifting sleeve 16 disposed between spaced-apart and substantially parallel end plates 18, wherein shroud plates 22 can be attached to end plates 18 with screws 26 to provide structural rigidity to actuator and to provide an enclosure for rack sleeve 14 and shifting sleeve 16 disposed therein. Mounting sleeve 12 can define longitudinal axis 11 extending therethrough. Anchor block 58 can be attached one end plate 18 with cap screws 60 as a stop to prevent actuator 10 from rotating when the drill stem is rotating.

In some embodiments, actuator 10 can comprise bearings 54 disposed between end plates 18 and mounting sleeve 12 to enable the structure of end plates 18, shroud plates 22, rack sleeve 14 and shifting sleeve 16 disposed therein to rotate relative to mounting sleeve about longitudinal axis 11. In some embodiments, end plates 18 can be held in position by spiral spring retainers 24 fitted into grooves 25 disposed about the ends of mounting sleeve 12. To affix actuator 10 to valve body 100, J-Band assembly 20 can be installed on the ends of mounting sleeve 12 by engaging groove 13 disposed about mounting sleeve 12 and groove 15 disposed about valve body 100, and then held in place by T-bolt clamps 21. In some embodiments, actuator 10 can also comprise a plurality of set screws 32 threaded through mounting sleeve 12, set screws 32 fully configured to engage valve body 100.

Figure 3:
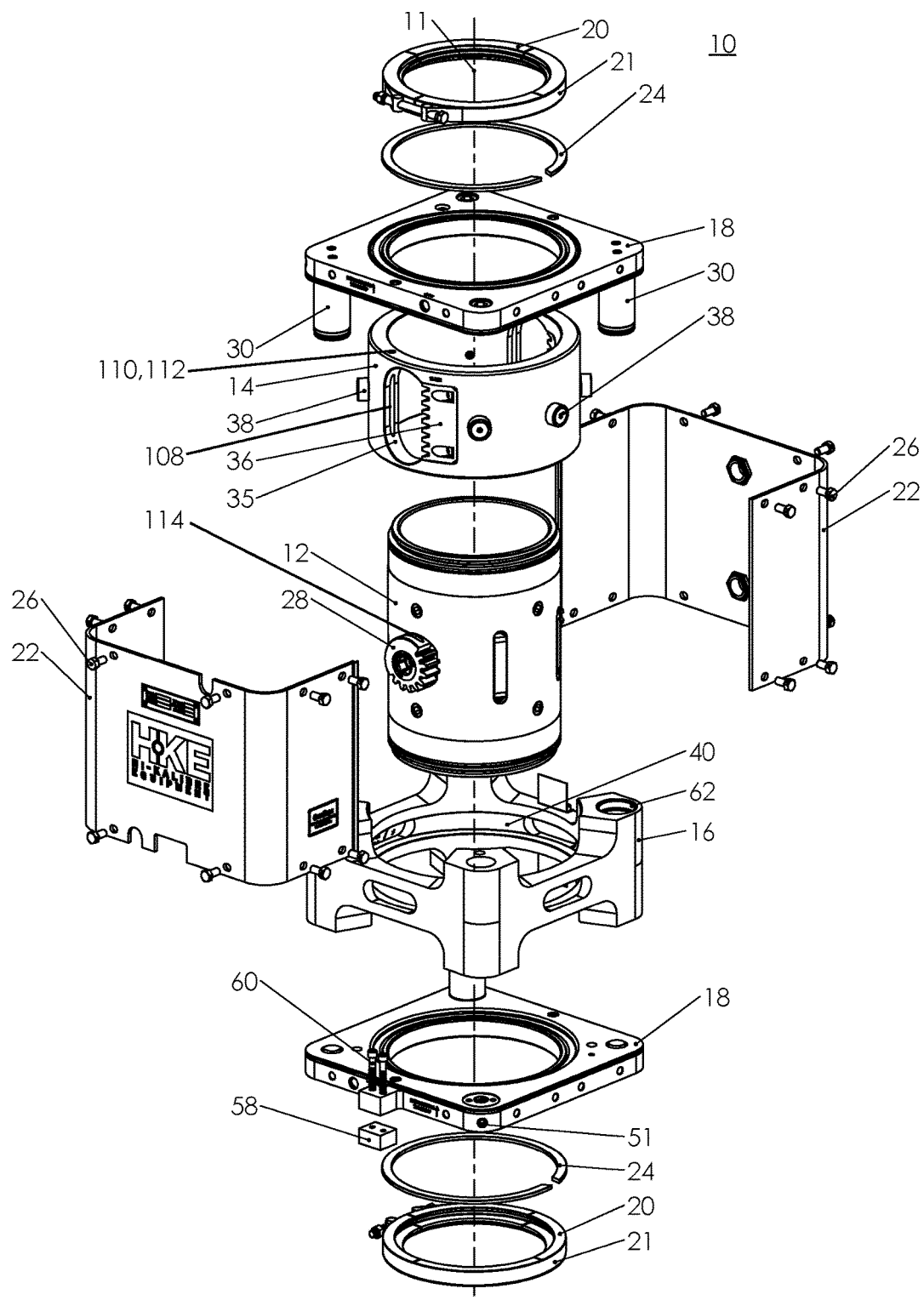
FIG. 3 is an exploded perspective view depicting the actuator of FIG. 1.
Figure 9:
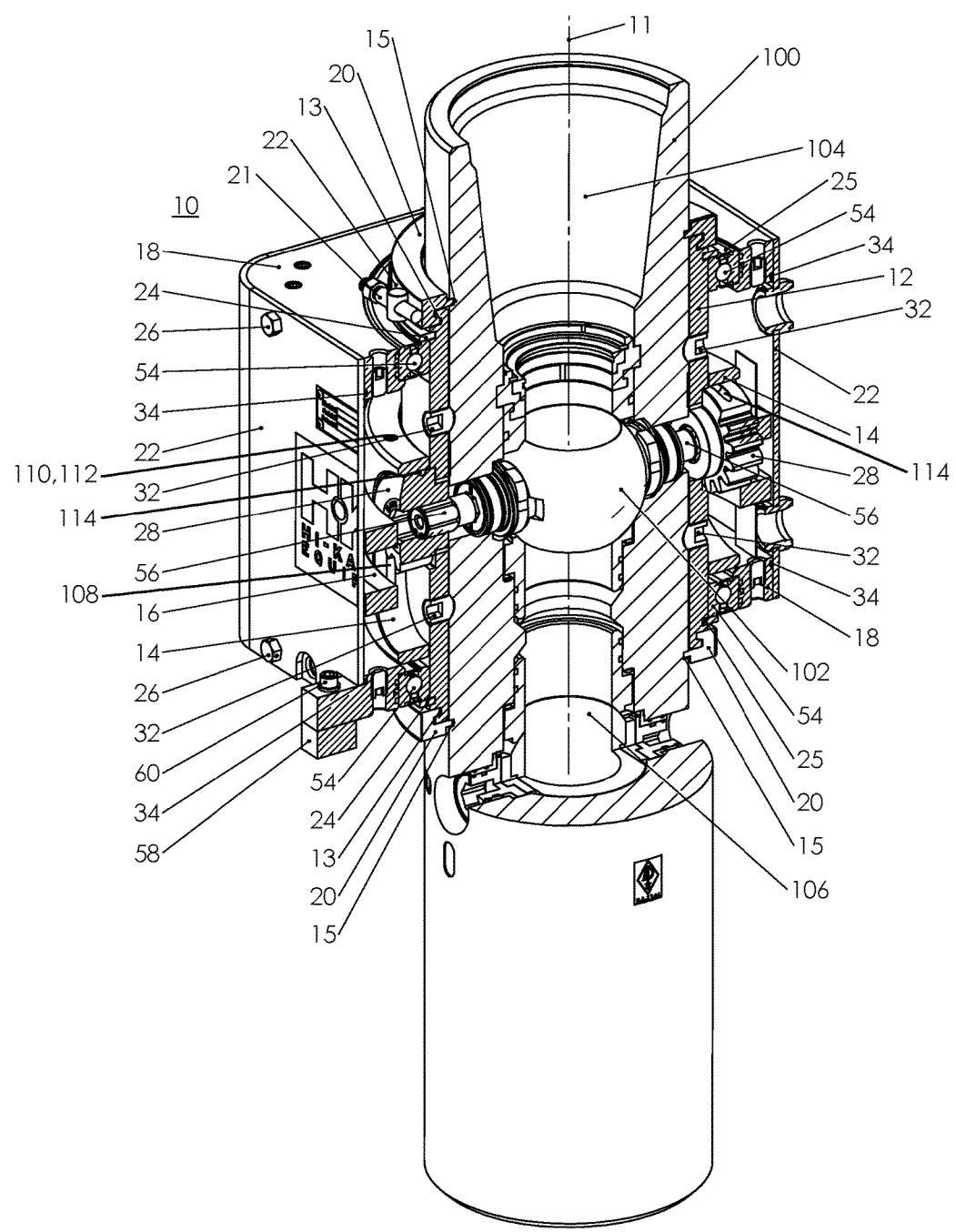
FIG. 9 is a perspective cross-section view depicting the actuator of FIG. 1 installed on a drill stem safety valve.

In some embodiments, mounting sleeve 12 can comprise one or more master pinion 28, a gear that can couple to ball valve drive 56 that, in turn, can rotate ball valve 102 disposed in valve body 100, as shown in FIG. 9. Master pinion 28 can comprise hex opening 27 for manually rotating master pinion 28 with a hex wrench. When rack sleeve 14 is circumferentially disposed on mounting sleeve 12, master pinion 28 can be disposed in opening 35 to engage rack 36, thus, when rack sleeve slides along mounting sleeve 12, rack 36 can rotate master pinion 28 to rotate ball valve 102. In some embodiments, pinion retaining pin 108 can be inserted into receiving hole 110 such that pinion retaining pin 108 can be partially exposed along one side of opening 35 (as shown in FIGS. 3 and 9), wherein pinion retaining pin 108 can be configured to be at least partially disposed in groove 114 disposed along the circumference of master pinion 28 thus retaining master pinion 28 within opening 35 when master pinion 28 rotates. Pinion retaining pin 108 can be secured in receiving hole 110 by set screw 112 disposed into the opening of receiving hole 110.

In some embodiments, actuator 10 can comprise shifting sleeve 16 circumferentially disposed on rack sleeve 14. Rack sleeve 14 can comprise a plurality of spaced-apart rollers 38 disposed circumferentially on an outer sidewall thereof. Shifting sleeve 16 can comprise channel 40 disposed circumferentially on an inner sidewall thereof, channel 40 configured to receive plurality of rollers 38 wherein shifting sleeve 16 can rotate about longitudinal axis 11 relative to rack sleeve 14 and still move rack sleeve 14 along longitudinal axis 11 vis a vis channel 40 exerting force on rollers 38.

To enable movement of shifting sleeve 16 within actuator 10, each of end plates 18 can comprise at least one fixed piston 30 extending substantially perpendicular therefrom towards the opposing end plate 18. In some embodiments, each piston 30 can be inserted into a corresponding cylinder sleeve 62 disposed in shifting sleeve 16. In some embodiments, each end plate 18 can comprise inlet/outlet 42 and internal passageways (as described in more detail below) to pistons 30 as means for pressurized hydraulic fluid or air enable movement of shifting sleeve 16. By injecting pressurized fluid or air into inlet/outlet 42 of a first end plate 18, fluid or air can pass through a passageway disposed within at least one piston 30 to enter its corresponding cylinder sleeve 62 and, thus, move shifting sleeve 16 away from said first end plate 18. By injecting pressurized fluid or air into inlet/outlet 42 of the second end plate 18, fluid or air can pass through a passageway disposed within at least one piston 30 to enter its corresponding cylinder sleeve 62 and, thus, move shifting sleeve 16 from second end plate 18 toward first end plate 18.

Figure 4:
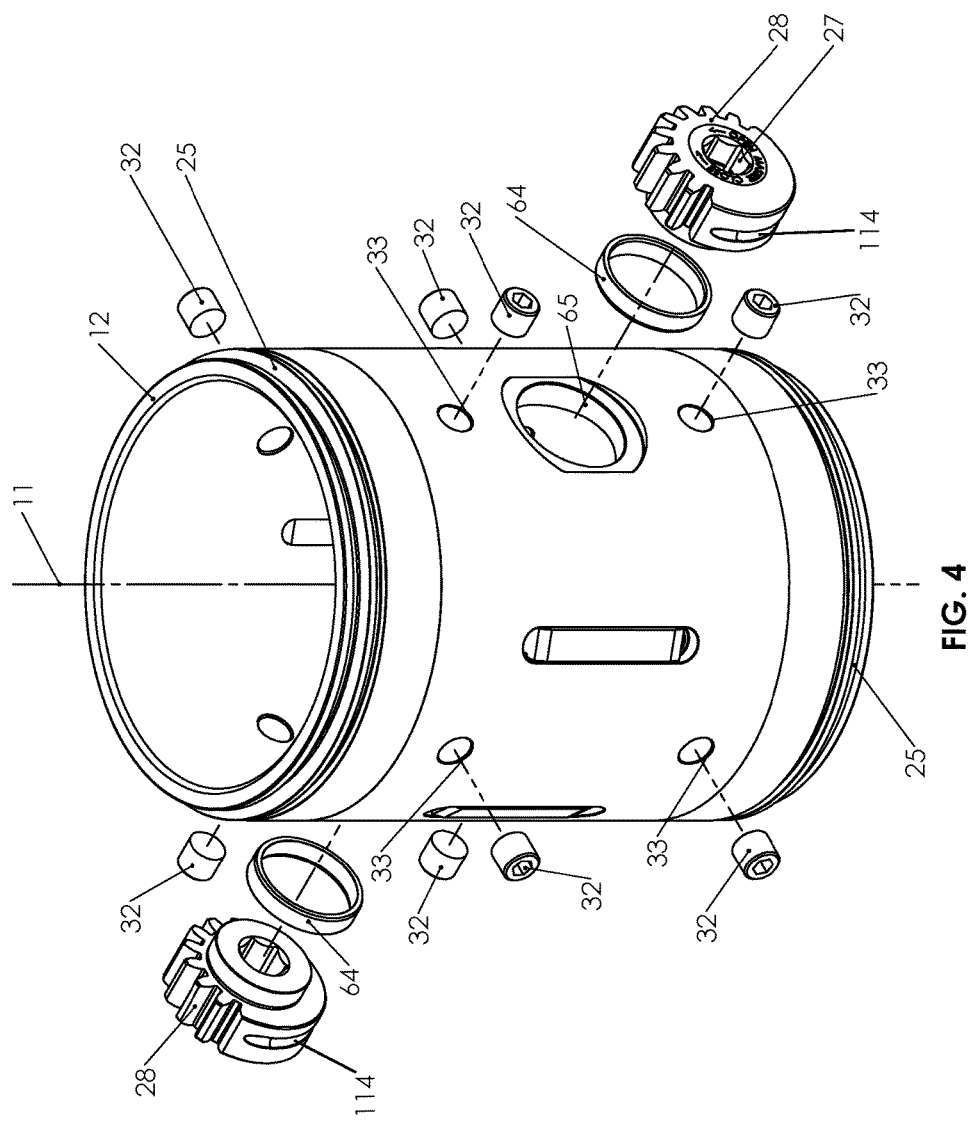
FIG. 4 is an exploded perspective view depicting the mounting sleeve of the actuator of FIG. 3.

Referring to FIG. 4, an exploded view of one embodiment of mounting sleeve 12 is shown. In some embodiments, mounting sleeve 12 can comprise a plurality of threaded holes 33 placed circumferentially about mounting sleeve 12 in a spaced-apart configuration to received set screws 32 to enable the attachment of mounting sleeve 12 to valve body 100, as shown in FIG. 9. In some embodiments, mounting sleeve 12 can comprise recessed opening 65 configured for receiving bushing 64, which is placed between master pinion 28 and recessed opening 65.

Figure 5:
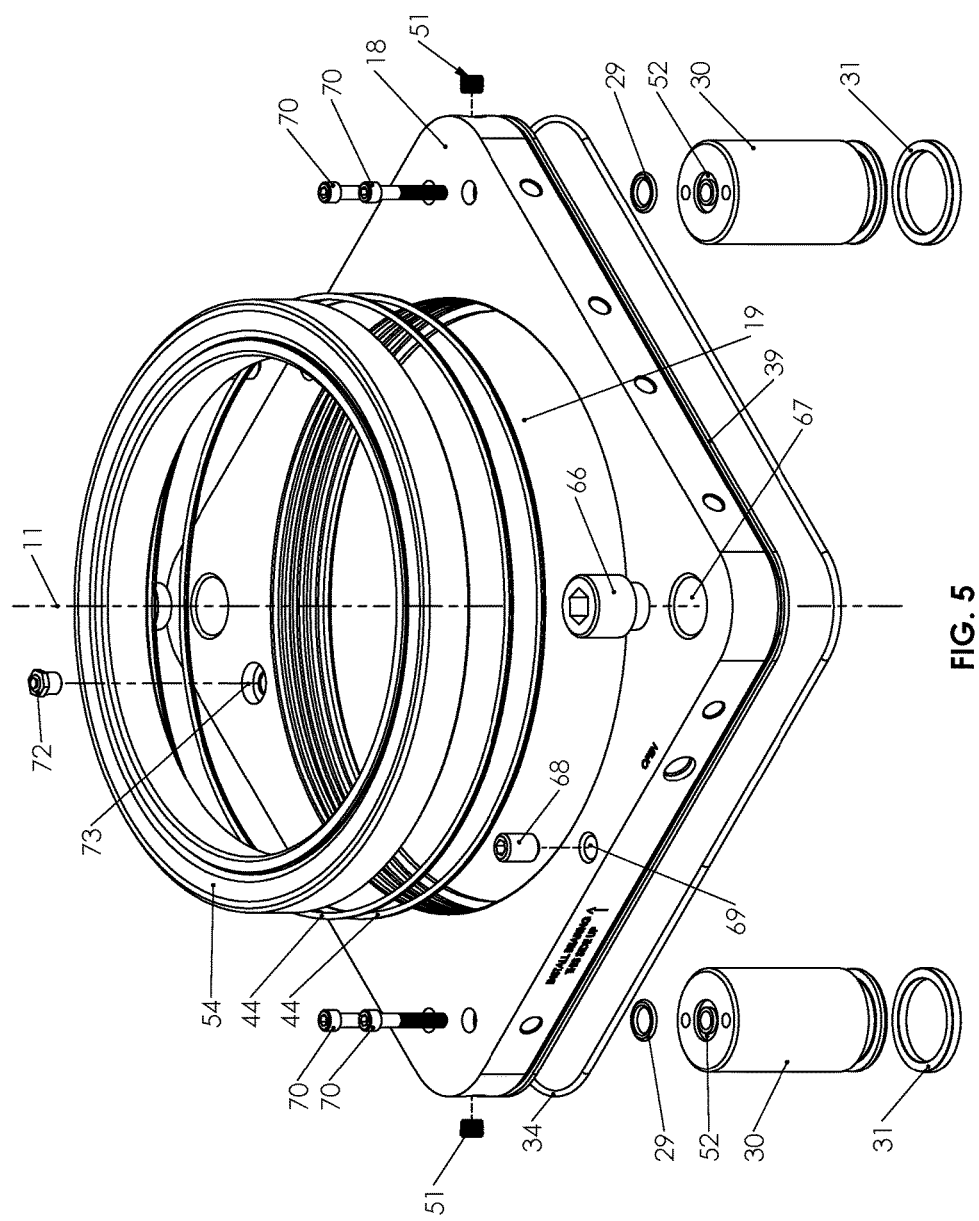
FIG. 5 is an exploded perspective view depicting an end plate of the actuator of FIG. 3.

Referring to FIG. 5, an exploded view of one embodiment end plate 18 is shown. In some embodiments, at least one piston 30 can be attached to end plate 18 with cap screws 70. O-ring 29 can be disposed between at least one piston 30 and end plate 18 to provide a seal for piston passageway 52. Each piston 30 can further comprise end seal 31 for providing a sealed slidably fitment with cylinder sleeve 62 disposed shifting sleeve 16. In some embodiments, o-rings 44 can be disposed in opening 19 between end plate 18 and main bearing 54 to provide a seal therebetween. In some embodiments, end plate 18 can comprise set screw 66 threadably disposed in in threaded opening 67 as means to provide a stop for shifting sleeve 16 when actuator 10 is fully assembled. In some embodiments, end plate 18 can comprise groove 39 disposed therearound to receive o-ring cord 34 as means to provide a seal between end plate 18 and shroud plate 22 when installed on actuator 10. In some embodiments, end plates 18 can comprise threaded holes 69 that can receive eyehooks (not shown) for lifting and moving actuator 10. When eyehooks are not used or required, holes 69 can be plugged with setscrews 68.

Figure 6A:
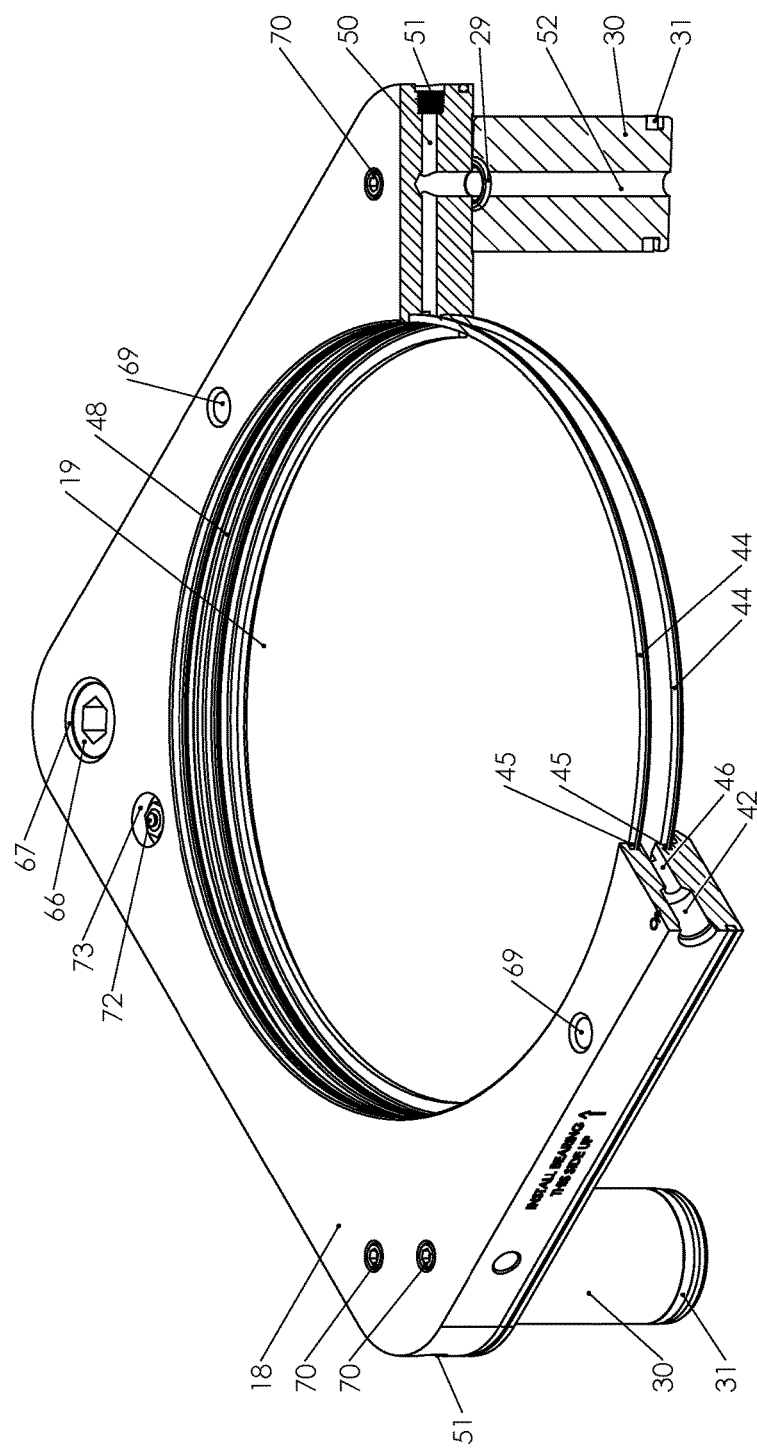
FIG. 6A is a cutaway perspective view depicting the end plate of FIG. 5.
Figure 6B:
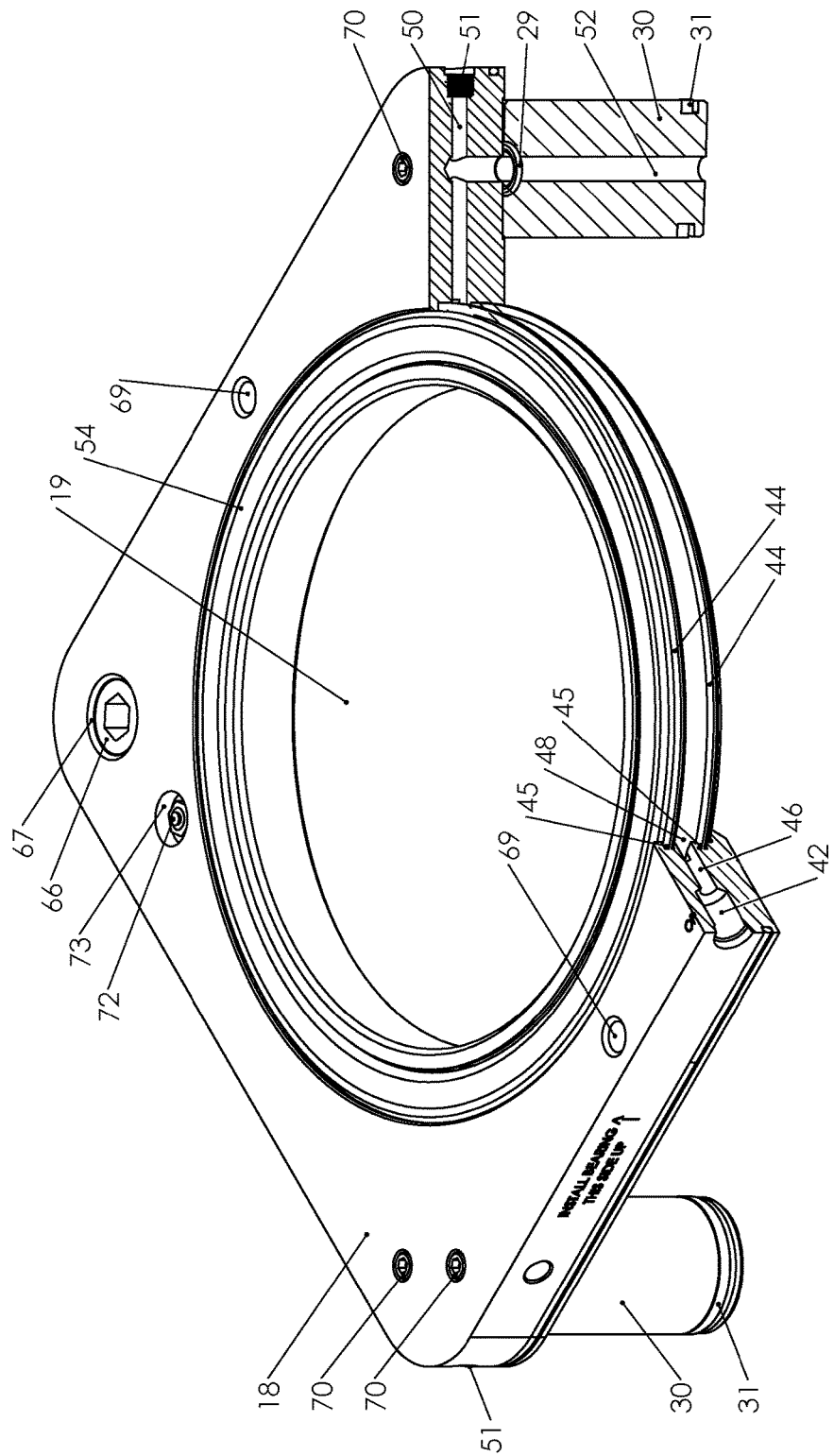
FIG. 6B is a cutaway perspective view depicting the end plate of FIG. 6A with a main bearing installed.

Referring to FIGS. 6A and 6B, cut-away views of one embodiment end plate 18 are shown, FIG. 6A without main bearing 54, FIG. 6B with main bearing 54. In some embodiments, a pair of o-rings 44 can be disposed in grooves 45 to, thus, provide channel 48 when main bearing 54 is installed therein. In some embodiments, passageway 46 can provide communication between inlet/outlet 42 and channel 48. In some embodiments, passageway 50 can provide communication between channel 48 and piston passageway 52. Plug 51 can be installed to seal off passageway 50 in end plate 18. Referring to FIGS. 5, 6A and 6B, in some embodiments, one or both end plates 18 can comprise pressure relief fitting 72 (as well known to those skilled in the art) threaded into hole 73, which can be disposed through end plate 18 and can further provide communication between atmosphere and the interior space within actuator when it is fully assembled with shroud plates 22 attached to end plates 18. In some embodiments, seals or gaskets (as well known to those skilled in the art) can be installed between shroud plates 22 and end plates 18 to fully enclose the interior space within actuator 10. In some embodiments, relief fitting 72 can operate to ensure that the pressure of air, gases or fluids within the interior space of actuator 10 does not exceed a predetermined level or threshold and damage internal components of actuator 10. When the pressure of the air, gases or fluids within the interior space of actuator 10 does exceed the predetermined level or threshold, relief fitting 72 can open and provide a communication path for pressurized air, gases or fluids to exit the interior space through hole 73 to atmosphere. In some embodiments, relief fitting 72 can be selected or configured to operate anywhere within an approximate range of 10 to 15 pounds per square inch, or at some other suitable pressure as well known to those skilled in the art.

Figure 7:
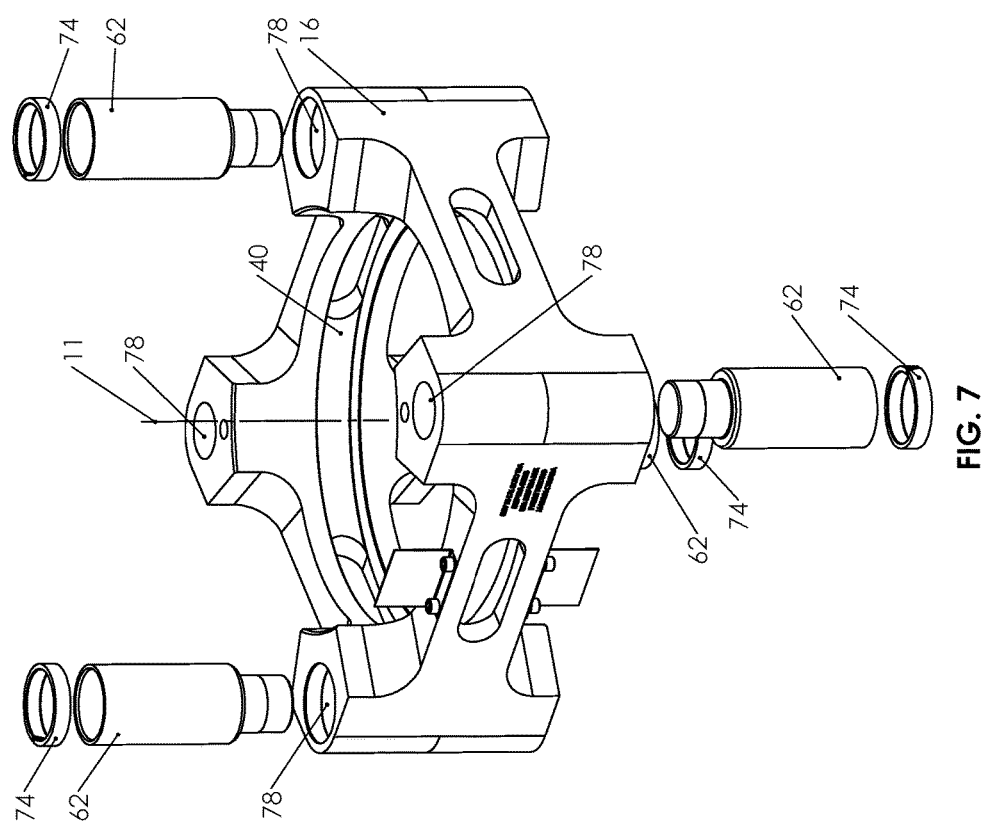
FIG. 7 is an exploded perspective view depicting the shifting sleeve of FIG. 3.

Referring to FIG. 7, an exploded view of one embodiment of shifting sleeve 16 is shown. In some embodiments, shifting sleeve 16 can comprise cylinders 78 disposed therethrough and configured for receiving cylinder sleeves 62. In some embodiment, cylinder sleeves 62 can further comprise wear rings 74 to provide wear protection when pistons 30 are inserted into cylinder sleeves 62. In some embodiments, cylinder sleeves 62 can comprise ports, which can be sealed with plugs 76.

Figure 8:
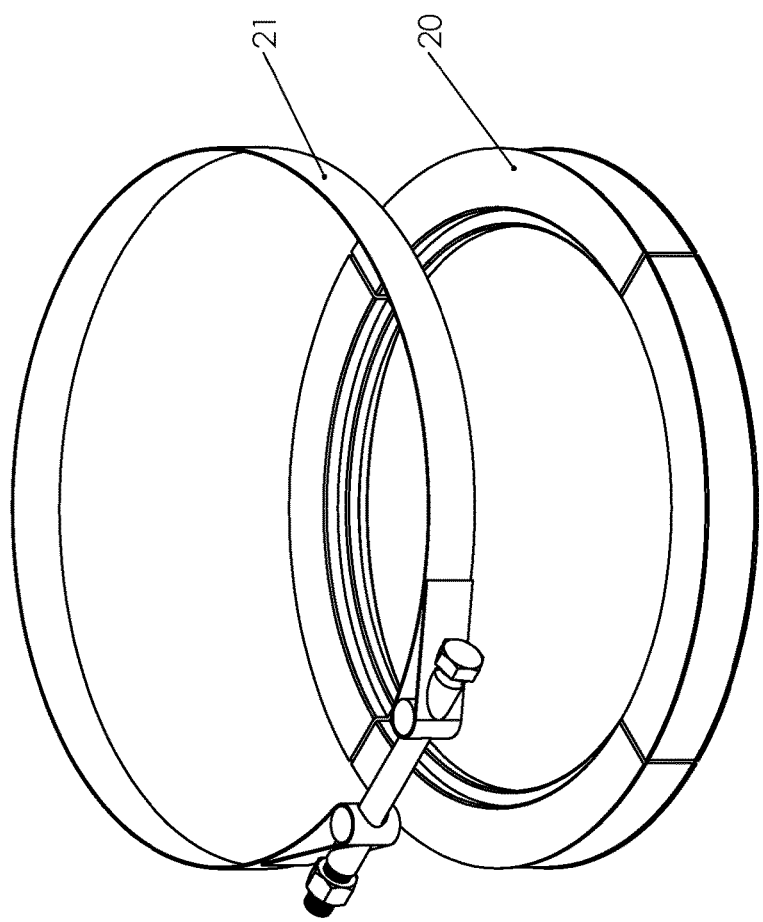
FIG. 8 is an exploded perspective view depicting the J-Band split assembly of FIG. 3.

Referring to FIG. 8, an exploded view of J-Band assembly 20 and T-bolt clamp 21 are shown, which can be used to secure mounting sleeve 12 to valve body 100 as shown in FIG. 9.

Referring to FIG. 9, actuator 10 is shown with rack sleeve 14 positioned at a most downward position wherein ball valve 102 is position in an "open" state such that there is communication between passageway 104 and passageway 106 within valve body 100. When shifting sleeve 16 is moved upwards via injection of pressurized hydraulic fluid or air into the appropriate inlet/outlet 42, rack sleeve 14 can move upwards from the mostward position, as shown in FIG. 9, to rotate master pinion 28 and, thus, ball valve drive 56 and ball valve 102 approximately 90° and, therefore, shut off communication between passageway 104 and passageway 106.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

We claim:

1. An actuator for operating a valve disposed in a rotatable drill stem comprising a passageway therethrough, the drill stem defining a longitudinal axis, the valve comprising a ball valve disposed therein, the ball valve configured for opening and closing the passageway, the actuator comprising:
   a) a mounting sleeve configured for attaching to the valve, the mounting sleeve further comprising a pinion configured for coupling to the ball valve and rotating the ball valve to open and close the passageway;
   b) a rack sleeve circumferentially disposed on the mounting sleeve and configured for slidable movement on the mounting sleeve along the longitudinal axis, the rack sleeve operatively coupled to the pinion wherein the pinion rotates about an axis substantially perpendicular to the longitudinal axis when the rack sleeve moves slidably on the mounting sleeve along the longitudinal axis; and
   c) shifting means for slidably moving the rack sleeve on the mounting sleeve, the shifting means rotatably coupled to the mounting sleeve and to the rack sleeve wherein the shifting means is substantially stationary when the drill stem is rotating, wherein the shifting means further comprises:
      i) first and second end plates rotatably attached to opposing ends of the mounting sleeve,
      ii) at least one shroud plate operatively connecting the first and second end plates to form at least a partial enclosure,
      iii) a shifting sleeve disposed between the first and second end plates and circumferentially disposed on the rack sleeve, the rack and shifting sleeves, in combination, comprising means for enabling the shifting sleeve to engage the rack sleeve and to rotate relative to the rack sleeve about the longitudinal axis, and
      iv) the first and second end plates and the shifting sleeve, in combination, comprising means for moving the shifting sleeve linearly back and forth between the first and second end plates thereby engaging the rack sleeve to move slidably on the mounting sleeve along the longitudinal axis.

2. The actuator as set forth in claim 1, wherein the mounting sleeve further comprises a pinion retaining pin configured to be at least partially disposed in a groove disposed at least partially around a circumference of the pinion when the pinion is rotating.

3. The actuator as set forth in claim 2, further comprising one or both of:
   a) the enabling means further comprising:
      (i) a plurality of spaced-apart rollers rotatably disposed circumferentially on an outer sidewall of the rack sleeve, and
      (ii) a channel disposed circumferentially on an inner sidewall of the shifting sleeve, the channel configured to receive the plurality of spaced-apart rollers; and
   b) the moving means further comprising:
      (i) at least one first displacement mechanism disposed between the first end plate and the shifting sleeve, the at least first displacement mechanism configured to urge the shifting sleeve away from the first end plate, and
      (ii) at least one second displacement mechanism disposed between the second end plate and the shifting sleeve, the at least second displacement mechanism configured to urge the shifting sleeve away from the second end plate.

4. The actuator as set forth in claim 1, wherein the pinion further comprises at least one gear coupled to a shaft that is configured to engage the ball valve.

5. The actuator as set forth in claim 1, wherein the mounting sleeve further comprises a plurality of set screws configured to engage the valve to attach the mounting sleeve thereto.

6. The actuator as set forth in claim 1, further comprising at least one clamp configured to clamp an end of the mounting sleeve to the valve.

7. The actuator as set forth in claim 1, wherein the rack sleeve further comprises a rack configured to engage with the pinion.

8. The actuator as set forth in claim 1, wherein the enabling means further comprises:
   a) a plurality of spaced-apart rollers rotatably disposed circumferentially on an outer sidewall of the rack sleeve; and
   b) a channel disposed circumferentially on an inner sidewall of the shifting sleeve, the channel configured to receive the plurality of spaced-apart rollers.

9. The actuator as set forth in claim 1, wherein the moving means further comprises:
   a) at least one first displacement mechanism disposed between the first end plate and the shifting sleeve, the at least first displacement mechanism configured to urge the shifting sleeve away from the first end plate; and
   b) at least one second displacement mechanism disposed between the second end plate and the shifting sleeve, the at least second displacement mechanism configured to urge the shifting sleeve away from the second end plate.

10. The actuator as set forth in claim 9, wherein each of the at least one first and second displacement mechanisms comprises one or more of a group consisting of a hydraulic piston and cylinder combination, a pneumatic piston and cylinder combination, an electric screwjack and a linear actuator.

11. A method for operating a valve disposed in a rotatable drill stem comprising a passageway therethrough, the drill stem defining a longitudinal axis, the valve comprising a ball valve disposed therein, the ball valve configured for opening and closing the passageway, the method comprising the steps of:
   a) providing an actuator, comprising:
      (i) a mounting sleeve configured for attaching to the valve, the mounting sleeve further comprising a pinion configured for coupling to the ball valve and rotating the ball valve to open and close the passageway,
      (ii) a rack sleeve circumferentially disposed on the mounting sleeve and configured for slidable movement on the mounting sleeve along the longitudinal axis, the rack sleeve operatively coupled to the pinion wherein the pinion rotates about an axis substantially perpendicular to the longitudinal axis when the rack sleeve moves slidably on the mounting sleeve along the longitudinal axis, and
      (iii) shifting means for slidably moving the rack sleeve on the mounting sleeve, the shifting means rotatably coupled to the mounting sleeve and to the rack sleeve wherein the shifting means is substantially stationary when the drill stem is rotating, wherein the shifting means further comprises first and second end plates rotatably attached to opposing ends of the mounting sleeve, at least one shroud plate operatively connecting the first and second end plates to form at least a partial enclosure, a shifting sleeve disposed between the first and second end plates and circumferentially disposed on the rack sleeve, the rack and shifting sleeves, in combination, comprising means for enabling the shifting sleeve to engage the rack sleeve and to rotate relative to the rack sleeve about the longitudinal axis, and the first and second end plates and the shifting sleeve, in combination, comprising means for moving the shifting sleeve linearly back and forth between the first and second end plates thereby engaging the rack sleeve to move slidably on the mounting sleeve along the longitudinal axis;
   b) attaching the actuator to the valve; and
   c) moving the rack sleeve relative to the mounting sleeve using the shifting sleeve to rotate the ball valve.

12. The method as set forth in claim 11, wherein the mounting sleeve further comprises a pinion retaining pin configured to be at least partially disposed in a groove disposed at least partially around a circumference of the pinion when the pinion is rotating.

13. The method as set forth in claim 12, wherein the actuator further comprises one or both of:
   a) the enabling means further comprising:
      (i) a plurality of spaced-apart rollers rotatably disposed circumferentially on an outer sidewall of the rack sleeve, and
      (ii) a channel disposed circumferentially on an inner sidewall of the shifting sleeve, the channel configured to receive the plurality of spaced-apart rollers; and
   b) the moving means further comprising:
      (i) at least one first displacement mechanism disposed between the first end plate and the shifting sleeve, the at least first displacement mechanism configured to urge the shifting sleeve away from the first end plate, and
      (ii) at least one second displacement mechanism disposed between the second end plate and the shifting sleeve, the at least second displacement mechanism configured to urge the shifting sleeve away from the second end plate.

14. The method as set forth in claim 11, wherein the pinion further comprises at least one gear coupled to a ball valve drive that is configured to engage the ball valve.

15. The method as set forth in claim 11, wherein the mounting sleeve further comprises a plurality of set screws configured to engage the valve to attach the mounting sleeve thereto.

16. The method as set forth in claim 11, the actuator further comprising at least one clamp configured to clamp an end of the mounting sleeve to the valve.

17. The method as set forth in claim 11, wherein the rack sleeve further comprises a rack configured to engage with the pinion.

18. The method as set forth in claim 11, wherein the enabling means further comprises:
   a) a plurality of spaced-apart rollers rotatably disposed circumferentially on an outer sidewall of the rack sleeve; and
   b) a channel disposed circumferentially on an inner sidewall of the shifting sleeve, the channel configured to receive the plurality of spaced-apart rollers.

19. The method as set forth in claim 11, wherein the moving means further comprises:
   a) at least one first displacement mechanism disposed between the first end plate and the shifting sleeve, the at least first displacement mechanism configured to urge the shifting sleeve away from the first end plate; and
   b) at least one second displacement mechanism disposed between the second end plate and the shifting sleeve, the at least second displacement mechanism configured to urge the shifting sleeve away from the second end plate.

20. The method as set forth in claim 19, wherein each of the at least one first and second displacement mechanisms comprises one or more of a group consisting of a hydraulic piston and cylinder combination, a pneumatic piston and cylinder combination, an electric screwjack and a linear actuator.

* * * * *